INVENTORS.
WINSLOW E. RYAN
ROBERT J. McCORMICK

BY *Joseph H. Roediger*
ATTORNEY.

United States Patent Office

3,525,640
Patented Aug. 25, 1970

3,525,640
METHOD OF FABRICATING IRON ELECTRODES FOR ALKALINE STORAGE BATTERIES
Robert J. McCormick, Yorktown Heights, and Winslow E. Ryan, Pleasantville, N.Y., assignors to Sylvania Electric Products Inc., a corporation of Delaware
Filed July 18, 1968, Ser. No. 745,792
Int. Cl. H01m 35/30
U.S. Cl. 136—76                9 Claims

ABSTRACT OF THE DISCLOSURE

A method for making sintered iron electrodes is described wherein high purity iron particles having a small nominal diameter are sintered onto a conductive mesh to form a plaque having a porosity within the range of 50 to 70 percent. The plaque is resintered to promote interconnections between the iron particles and, thereby, lower the resistivity of the plaque to within the range of $6 \times 10^{-5}$ to $8 \times 10^{-5}$ ohm-cm. The plaque is then electrochemically activated by cycling in a sulfur-containing alkaline solution.

BACKGROUND OF THE INVENTION

This invention relates to a method of fabricating sintered iron electrodes for alkaline storage batteries.

The nickel-iron cell was first introduced as a commercial product about 60 years ago as result of the investigations of T. A. Edison. This type of cell utilizes an alkaline iron negative electrode in combination with a nickel hydroxide positive electrode. The electrolyte employed in the cell is normally a lithia-containing alkaline solution. Since the cell has been used extensively over a relatively long period, the operating characteristics of the Edison-type cell as well known. For example, nickel-iron cells are characterized as rugged cells with long operational lifetimes. As a result, the nickel-iron system has been employed in heavy-duty industrial applications.

While the nickel-iron cell is less expensive than the nickel-cadmium type of cell, the use of the nickel-iron cell has not been favored in applications wherein a high rate of discharge at a relatively constant high voltage is required. The nickel-cadmium cell can provide this type of operation and, consequently, has experienced widespread usage in spite of its relatively higher cost. The limitation of low cell voltage of the nickel-iron cell during high rate discharge is due primarily to the characteristics of the iron negative electrode.

Generally, the iron electrode in a conventional nickel-iron cell is a pocket-type of electrode wherein the active material is contained in small pockets formed in a finely perforated steel sheet. The active material, which is pressed into the pockets, is formed by dissolving pure iron in sulfuric acid to form ferrous sulfate. The ferrous sulfate is recrystallized and then oxidized to form a mixture of ferrous oxide and metallic iron. This mixture of active material is pressed into a sheet containing the pockets and, in combination with a nickel electrode, is ready to be used in an alkaline electrolyte.

The use of the pocket-type of iron electrode contributes to the inability of the nickel-iron cell to maintain a high voltage at high discharge rates. In practice, the discharge rate of a cell is specified in terms of its rated capacity C which indicates the ampere-hour capacity of the cell. In the case of the nickel-iron cell, the effect on cell voltage due to discharge rate is considerable with the voltage dropping quite rapidly at discharge rates above C/3. If the cut-off voltage for operation is set at 1.0 volt, discharging the Edison type nickel-iron cell at rates higher than C/1.5 is not practical for commercial applications. This is due to the fact that when the cell is discharged at a high rate, the discharge is terminated as a result of the low cell voltage when only 20 to 25 percent of the cells ampere-hour capacity has been removed.

The inability of the nickel-iron cell to sustain a high discharge rate is attributable in part to the construction of the iron electrode. The electrode contributes significantly to the internal resistance of the cell and its contribution increases during discharge. The resistance of the electrode is determined primarily by the distance between the active material and the conductive support structure. This distance varies during cell operation due to dimensional changes in the support and the active material.

Accordingly, the present invention is directed to the fabrication of an iron electrode which permits a nickel-iron cell to be discharged at high rates and deliver an increased amount of its capacity to a load.

SUMMARY OF THE INVENTION

The iron electrode which is the subject of the present invention is fabricated by sintering a mixture of iron particles having a nominal diameter within the range of 3 to 5 microns onto a conductive mesh substrate to form a self-supporting plaque.

The plaque so formed is characterized by having a porosity within the range of 50 to 70 percent and a resistivity within the range of $6 \times 10^{-5}$ to $8 \times 10^{-5}$ ohm-cm. The sintered iron plaque is then electrochemically activated in a sulfur-containing alkaline solution. By utilizing a mixture having a particle size within this range and controlling the sintering conditions to provide the required porosity and resistivity, the iron electrode so formed has a relatively low internal resistance and thus enables a nickel iron cell to be discharged at a relatively high rate and deliver a substantial portion of its capacity to a load.

The controlling of the particle size, the porosity and the sintering conditions to provide the required range of resistivities result in a plaque which is found to exhibit a substantial increase in surface area, for example 20 times or more, after activation. This increases the capacity of the cell incorporating the present electrode. In practice, sintered iron electrodes having a surface area after activation which is less than 15 meters ²/gram of iron are found to have insufficient ampere-hour capacity for commercial applications.

The sintered iron electrodes formed in accordance with the present method are found to have high discharge characteristics which are comparable with the well-known nickel-cadmium cell. In addition, these high discharge characteristics indicate a marked improvement when compared with the conventional nickel-iron cell utilizing pocket-type iron electrodes.

In a preferred series of steps to form a sintered iron electrode, the plaque is formed by sintering so that it is self-supporting and has a porosity within the range of 60 to 80 percent. Then, the plaque is coined or compacted to form uniform edges and an electrode contact area. Next, the plaque is resintered to maintain the porosity within the above range and to provide interconnections between the small iron particles which result in the resistivity being lowered to within the range of $6 \times 10^{-5}$ to $8 \times 10^{-5}$ ohm-cm. At higher resistivities, the internal resistance of the electrode adversely affects the discharge characteristics of the cell. The lower limit of resistivity indicates when the degree of interconnection of the particles within the plaque is sufficiently adversed to effectively reduce the surface area and thereby substantially limit the capacity of the activated electrode.

Further features and advantages of the present invention will become more readily apparent from the following detailed description when taken in conjunction with the accompanying drawings.

DESCRIPTION OF THE PREFERRED EMBODIMENTS

Figure 1:
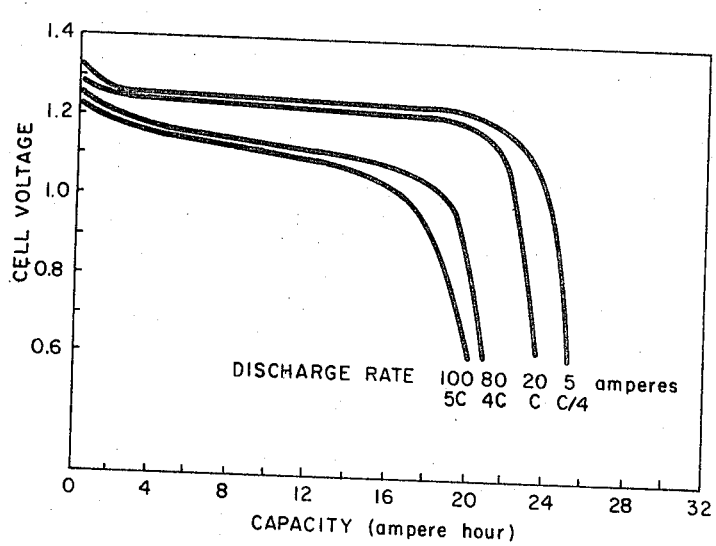
FIG. 1 is a series of curves showing the discharge characteristics of a nickel-iron cell containing an iron electrode fabricated in accordance with the present invention.

The initial step in the present method of fabricating iron electrodes includes the formation of a self-supporting porous iron plaque by the sintering of a mixture of iron particles onto a conductive substrate, typically a nickel mesh. The iron particles are preferably of high purity, for example carbonyl iron, and are required to have a relatively small nominal diameter within the approximate range of 3 to 5 microns.

The sintered plaques are formed to have a porosity within the range of 50 to 70 percent. If the porosity exceeds this range, the plaque is found to lack the structural properties necessary to enable it to withstand the activation steps. Also, plaques having less than 50 percent porosity have been found to exhibit low capacity and are not well-suited for use in a cell. In addition to the particle size and porosity, the resistivity of the plaque prior to activation indicates the degree of interconnection between particles in the porous plaque. The formation of interconnections is promoted in the present fabrication method since the internal resistance of the resultant cell is inversely related to the degree of interconnection.

While the porous plaque may be formed by a single sintering step, the uniformity of the plaque characteristics, particularly resistivity and porosity, is enhanced by the use of several steps. In a preferred method of fabricating the plaques, high purity carbonyl iron particles having the required relatively small diameter are contained in a suspension and are cast in the form of films on a conductive wire mesh substrate, typically formed of nickel. The cast film is dried and fired to provide a porous plaque. Suitable techniques for forming the initial porous plaques are described in U.S. Pats. 3,314,821, 3,323,915 and 3,345,213 which are assigned to the assignee in the instant application. However, other methods may be utilized to initially form the plaque if desired.

The plaque formed of small diameter iron particles is then trimmed to size and coined in a die to the desired thickness. In addition, the coining step is utilized to form a tab portion on one edge of the plaque to facilitate the making of electrical contact to the completed electrode. After coining, the plaque is resintered to promote the formation of interconnections between the iron particles. The resintering process has been found to provide a relatively minor effect on the porosity of the initially sintered plaque, typically a porosity variation of about ±2 percent is experienced. However, the resintering does affect the thickness of the initial plaque with shrinkage normally being within the range of 8 to 10%.

The resintering conditions vary in accordance with the type of oven and the size of the plaque. A typical resintering step comprises heating the coined plaque to a temperature within the range of 1400 to 1700° F. in a dry hydrogen atmosphere for a period of 5 minutes. At this point, the resistivity of the plaque is determined and, if found to be greater than $8 \times 10^{-5}$ ohm-cm., an additional period of resintering is utilized so that the resistivity of the processed plaque lies within the range of $6 \times 10^{-5}$ to $8 \times 10^{-5}$ ohm-cm. Care should be taken during the resintering step to insure that the resistivity does not decrease to below $6 \times 10^{-5}$ ohm-cm. for two primary reasons; one, internal resistance should not be substantially eliminated since it limits the short-circuit current and, two, a lowering of the resistivity indicates an increased degree of interconnection between particles in the plaque and a corresponding decrease in the surface area of the porous plaque.

The surface area of the porous plaque has a direct effect on the ability of the electrode to provide a high rate discharge at relatively high cell voltages since the distance between the activated material formed within the porous plaque and the plaque material affects the internal resistance of the cell utilizing the electrode. If the degree of interconnection between particles is increased to the point where the resistivity of the plaque is less than $6 \times 10^{-5}$ ohm-cm., the interstitial spaces or pores of the plaque are relatively small and the average distance between the later-added activated material and the plaque material is increased. Since the activated material is a poor electrical conductor, the resistance of the resultant cell is substantially increased and, thus, the cell exhibits limited high rate discharge characteristics.

The combination of the use of the small diameter particles, the afore-recited porosity and the sintering to promote interconnections between particles so that the plaque exhibits the required resistivity have been found to provide an iron electrode, which when electrochemically activated, enables a nickel-iron cell to exhibit the high rate discharge characteristics normally attributed to the more expensive nickel-cadmium cell.

The formed plaques are electrochemically activated by placing them in an activation tank containing an activating solution of sulfur and potassium hydroxide. The solution is prepared by dissolving one mole (32 grams) of sublimed sulfur in one liter of 30 percent KOH at 75° C. The activation is also provided with counterelectrodes and a DC power supply is coupled between the counterelectrodes and the iron plaques. The negative terminal of the supply is coupled to the plaques. The plaques are then charged for about 36 hours at a current density of approximately 0.05 ampere/inch$^2$ of plaque area (including both faces of the plaque). At the completion of this initial period, the power supply is disconnected and the solution drained from the tank. The plaques and tank are then rinsed with deionized water and refilled with a 30 percent KOH solution. The power supply is then reconnected for a second charging period wherein a charge current density of about .015 ampere/inch$^2$ is applied for 4 hours. At this time, the polarity is reversed and the plaques are discharged at the same rate for the same period. The cyling is twice repeated until on the last discharge the activated iron electrodes are fully discharged. The iron electrodes are then washed and dried preparatory to storage.

The activated iron electrodes are employed with a conventional activated nickel electrode in a vented type nickel-iron cell. In nickel-iron cells containing the iron electrode formed in accordance with the steps of the present method, alternate types of plates were formed in a stack with a separator interposed between adjacent plates. The stack was fitted in a cell case with all iron plates being connected to the negative terminal and all nickel plates connected to the positive terminal. The cells were filled with a 30 percent potassium hydroxide electrolyte containing 18 grams per liter of lithium hydroxide.

Figure 2:
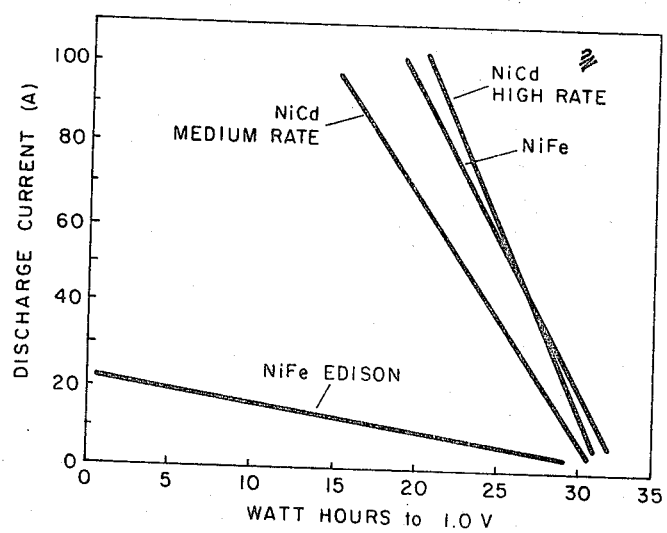
FIG. 2 is a series of curves which compare the discharge characteristics of commercially available cells with the discharge characteristic of the cell tested in FIG. 1.
Figure 3:
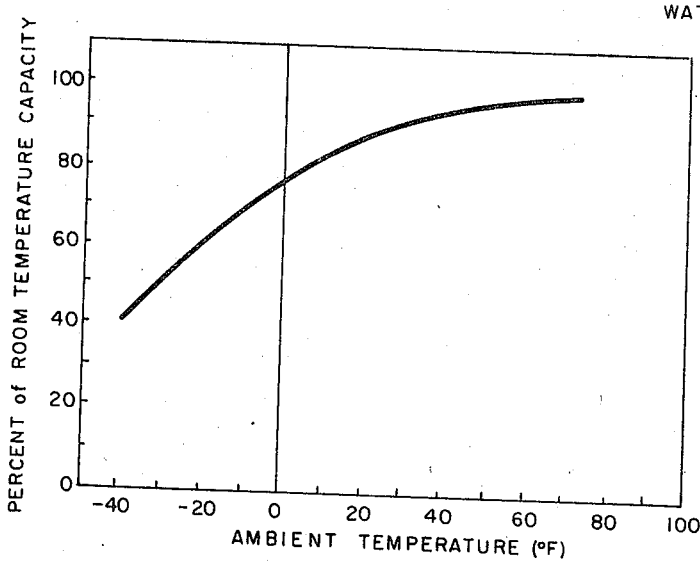
FIG. 3 is a curve showing the temperature performance of the cell tested in FIG. 1.

The results of the tests performed on the cells are shown in FIGS. 1, 2 and 3. In particular, the curves of FIG. 1 show the discharge characteristics of a 20 ampere-hour discharged at various rates at an ambient temperature of 75° F. It shall be noted that even at the high 4C and 5C discharge rates substantially the entire capacity of the cell was supplied before the cell voltage dropped to less than 1.0 voltage. A comparison of the discharge characteristics of two types of nickel-cadmium cells, the nickel-iron Edison cell and the nickel-iron cell utilizing the present iron electrode is set forth in FIG. 2. The NiFe curve therein relating to a cell utilizing the iron electrode formed in accordance with the present method clearly shows that the high rate discharge characteristics of the nickel-iron cell are essentially equivalent to the high rate discharge characteristics of a nickel-cadmium cell. In addition, the low temperature performance characteristics of cells containing this iron electrode are shown by the curve of FIG. 3 wherein a 20 a.h. cell was discharged at a constant 5 amperes.

Further operating characteristics of these cells are shown in the following table wherein 20 a.hr. vented cells using the present iron electrode were constructed with 19 nickel and 18 iron electrodes. The cells had an outside volume of 28.4 inch$^3$ and weighed about 2.0 lbs. All cells were charged at 10 amperes for 4 hours and allowed to stand 1½ to 2 hours before discharge at room temperature. It should be noted that in none of these tests was there any evidence that the iron electrode limited cell performance.

| Cycle | Current, (a.) | Capacity, (a.hr.) | Mid-voltage | Watt, hr./lb. | Watt, hr./cu. in. |
|---|---|---|---|---|---|
| 2 | 5 | 26.29 | 1.261 | 16.2 | 1.17 |
| 3 | 5 | 27.43 | 1.268 | 17.0 | 1.22 |
| 4 | 5 | 26.36 | 1.264 | 16.2 | 1.17 |
| 5 | 20 | 25.13 | 1.219 | 15.0 | 1.08 |
| 6[1] | 5 | 33.2 | 1.258 | 19.9 | 1.47 |
| 7 | 80 | 19.83 | 1.065 | 10.3 | .75 |

[1] Charged 500 a.hr. instead of 40 a.hr.

The advantages obtained by fabricating an iron electrode in accordance with the present method wherein the particle size, porosity and resistivity of the plaque are regulated to provide an iron electrode for a nickel-iron cell capable of providing high rate discharge characteristics which are equivalent to the characteristics of the more costly nickel-cadmium cell.

While the above description has referred to specific embodiments of the invention, it will be recognized that many variations and modifications may be made therein without departing from the spirit and scope of the invention.

What is claimed is:

1. A method of fabricating porous sintered iron electrodes for alkaline storage batteries which comprises:
    (a) sintering a mixture of iron particles having a nominal diameter within the range of 3 to 5 microns to form a plaque having a resistivity within the range of $6 \times 10^{-5}$ to $8 \times 10^{-5}$ ohm-cm., and having a porosity within the range of 50 to 70 percent;
    (b) electrochemically activating said plaque in a sulfur-containing alkaline solution whereby the surface area of said plaque is converted to electrochemically active material.

2. The method in accordance with claim 1 wherein the step of sintering the mixture to form a plaque comprises the steps of
    (a) sintering the mixture of high purity iron particles to form a plaque having a porosity within the range of 50 to 70 percent, and
    (b) resintering the plaque to promote the formation of interconnections between particles therein, said resintering step lowering the resistivity of said plaque to within the range of $6 \times 10^{-5}$ to $8 \times 10^{-5}$ ohm-cm.

3. The method in accordance with claim 2 wherein the step of sintering the mixture of high purity iron particles comprises the steps of
    (a) sintering iron particles having a nominal diameter within the range of 3 to 5 microns onto a conductive mesh substrate to form a plaque, and
    (b) coining said plaque to compact the edges and form a tab area for making electrical contact thereto, said plaque having a porosity within the range of 50 to 70 percent after coining.

4. The method in accordance with claim 3 wherein said iron particles are high purity carbonyl iron particles.

5. The method in accordance with claim 3 wherein said conductive substrate is a nickel mesh substrate.

6. The method of fabricating porous sintered iron electrodes for alkaline storage batteries which comprises:
    (a) sintering a mixture of iron particles having a nominal diameter within the range of 3 to 5 microns onto a conductive mesh substrate to form a plaque;
    (b) coining said plaque to compact the edges, said plaque having a porosity within the range of 50 to 70 percent;
    (c) resintering said plaque to promote the formation of interconnections between particles therein, the resintered plaque having a resistivity within the range of $6 \times 10^{-5}$ to $8 \times 10^{-5}$ ohm-cm., and
    (d) electrochemically activating said plaque in a sulfur-containing alkaline solution whereby the surface area of said plaque is converted to electrochemically active material.

7. The method in accordance with claim 6 wherein said iron particles consist essentially of carbonyl iron and said conductive substrate is formed of nickel mesh.

8. The method of claim 6 wherein said resintering step includes heating the coined plaque to a temperature within the range of 1400° to 1700° F.

9. The method of claim 6 wherein the step of electrochemically activating said plaque comprises the steps of
    (a) placing the plaque in an activation tank provided with a counter electrode, said tank containing an activating solution of sulfur and potassium hydroxide in the proportion of 1 mole of sulfur to one liter of 30 percent KOH;
    (b) coupling a DC power supply between said plaque and said counter electrode, the negative terminal of said power supply being connected to the plaque;
    (c) charging said plaque for an initial period of 36 hours at a current density of 0.05 ampere/inch $^2$;
    (d) removing said activating solution of sulfur and potassium hydroxide from the tank after the completion of the initial period and refilling said tank with a solution of 30 percent KOH;
    (e) charging said plaque for a second charge period of 4 hours at a current density of .015 ampere/inch $^2$;
    (f) discharging said plaques for a period of 4 hours at a current density of .015 ampere/inch $^2$; and
    (g) twice repeating said charging and discharging steps at a current density of .015 ampere/inch $^2$, the final discharge step essentially fully discharging the activated plaque.

References Cited

UNITED STATES PATENTS

| | | | |
|---|---|---|---|
| 1,940,385 | 12/1933 | Ackermann | 136—25.3 |
| 1,988,861 | 1/1935 | Thorausch et al. | 136—25.3 |
| 2,871,281 | 1/1959 | Moulton et al. | 136—25 |
| 2,988,585 | 6/1961 | Peters | 136—25 |
| 3,184,338 | 5/1965 | Mueller | 136—76 |
| 3,359,097 | 12/1967 | Beaver | 75—221 |

FOREIGN PATENTS

| | | |
|---|---|---|
| 473,625 | 5/1951 | Canada. |
| 570,345 | 2/1959 | Canada. |

WINSTON A. DOUGLAS, Primary Examiner

C. F. LE FEVOUR, Assistant Examiner

U.S. Cl. X.R.

136—25